(12) United States Patent
Combes et al.

(10) Patent No.: US 12,157,166 B2
(45) Date of Patent: Dec. 3, 2024

(54) METHOD FOR HOLDING A PART BLANK BY FLUID EXPANSION IN AN ADDITIVELY MANUFACTURED HOLDING PORTION

(71) Applicant: SAFRAN AIRCRAFT ENGINES, Paris (FR)

(72) Inventors: Guilhem Kevin Combes, Moissy-Cramayel (FR); Sébastien Vincent François Dreano, Moissy-Cramayel (FR); Pierre Jean-Baptiste Metge, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 404 days.

(21) Appl. No.: 17/755,468

(22) PCT Filed: Oct. 20, 2020

(86) PCT No.: PCT/FR2020/051887
§ 371 (c)(1),
(2) Date: Apr. 29, 2022

(87) PCT Pub. No.: WO2021/084187
PCT Pub. Date: May 6, 2021

(65) Prior Publication Data
US 2022/0395907 A1 Dec. 15, 2022

(30) Foreign Application Priority Data
Oct. 30, 2019 (FR) ...................................... 1912228

(51) Int. Cl.
*B22F 10/64* (2021.01)
*B22F 5/00* (2006.01)
(Continued)

(52) U.S. Cl.
CPC .............. *B22F 10/64* (2021.01); *B22F 5/009* (2013.01); *B22F 10/28* (2021.01); *B22F 10/40* (2021.01);
(Continued)

(58) Field of Classification Search
CPC .......... B22F 10/64; B22F 5/009; B22F 10/28; B22F 10/40; B22F 5/007; B22F 5/04;
(Continued)

(56) References Cited

U.S. PATENT DOCUMENTS 2,843,987 A * 7/1958 Lavigne .................... B67B 5/00
53/346
3,346,864 A * 10/1967 Harmon ................... H01Q 1/04
343/753
(Continued)

FOREIGN PATENT DOCUMENTS

| EP | 3511093 A1 | 7/2019 |
|---|---|---|
| FR | 2962061 A1 | 1/2012 |

OTHER PUBLICATIONS

Search Report issued in French Patent Application No. 1912228 dated Apr. 23, 2020.
(Continued)

*Primary Examiner* — Lawrence Averick
(74) *Attorney, Agent, or Firm* — Pearne & Gordon LLP

(57) ABSTRACT

A method for holding a part blank inside a holding assembly. The holding assembly includes a first holding portion. The first holding portion includes an inner cavity containing a fluid. The part blank and the first holding portion are at least partially manufactured by additive manufacturing. The holding method includes a heating of the holding assembly and the part blank to deform the first holding portion by fluid expansion in the inner cavity and to reduce a gap between
(Continued)

the part blank and the holding assembly by expansion of the first holding portion in relation to the part blank.

17 Claims, 2 Drawing Sheets

(51) Int. Cl.
| | | |
|---|---|---|
| *B22F 10/28* | (2021.01) | |
| *B22F 10/40* | (2021.01) | |
| *B23P 6/00* | (2006.01) | |
| *B25J 15/00* | (2006.01) | |
| *B33Y 10/00* | (2015.01) | |
| *B33Y 80/00* | (2015.01) | |

(52) U.S. Cl.
CPC ............ *B23P 6/007* (2013.01); *B25J 15/0047* (2013.01); *B25J 15/0061* (2013.01); *B33Y 10/00* (2014.12); *B33Y 80/00* (2014.12)

(58) Field of Classification Search
CPC ......... B23P 6/007; B33Y 10/00; B33Y 40/20; B33Y 80/00; F01D 5/286; F01D 25/285; F05D 2230/22; F05D 2230/234; F05D 2230/31; F05D 2230/40; Y02P 10/25; B29C 64/153; B29C 64/40
See application file for complete search history.

(56) References Cited

U.S. PATENT DOCUMENTS

| | | | | |
|---|---|---|---|---|
| 4,836,518 | A * | 6/1989 | Janutta | B23Q 3/08 |
| | | | | 269/37 |
| 5,013,014 | A * | 5/1991 | Mushardt | F01D 25/285 |
| | | | | 269/7 |
| 7,510,379 | B2 * | 3/2009 | Marusko | F01D 5/282 |
| | | | | 29/889.7 |
| 7,678,124 | B2 * | 3/2010 | Shifrin | A61B 17/12 |
| | | | | 606/157 |
| 10,208,925 | B2 * | 2/2019 | Vause | A61B 34/30 |
| 10,531,879 | B2 * | 1/2020 | Gerosolimo | A61B 17/128 |
| 10,631,868 | B2 * | 4/2020 | Ad | A61B 17/1285 |
| 10,660,649 | B2 * | 5/2020 | Ad | A61B 17/12013 |
| 10,661,447 | B2 * | 5/2020 | Curhan | B25J 15/10 |
| 10,850,391 | B2 * | 12/2020 | Lessing | B25J 15/0023 |
| 10,953,553 | B2 * | 3/2021 | Nakagawa | B25J 15/10 |
| 11,097,400 | B2 * | 8/2021 | Ijspeert | B23Q 3/063 |
| 11,584,002 | B2 * | 2/2023 | Lessing | B25J 9/1075 |
| 2006/0184197 | A1 * | 8/2006 | Shifrin | A61B 17/122 |
| | | | | 606/205 |
| 2007/0148000 | A1 * | 6/2007 | Marusko | F01D 5/282 |
| | | | | 416/193 A |
| 2015/0257839 | A1 * | 9/2015 | Vause | A61B 17/221 |
| | | | | 606/130 |
| 2017/0022821 | A1 * | 1/2017 | Ferber | F01D 5/025 |
| 2017/0340335 | A1 * | 11/2017 | Ad | A61B 17/122 |
| 2018/0042613 | A1 * | 2/2018 | Gerosolimo | A61B 17/122 |
| 2018/0361541 | A1 * | 12/2018 | Ijspeert | B25B 1/2426 |
| 2019/0061170 | A1 * | 2/2019 | Curhan | B25J 15/0616 |
| 2019/0168382 | A1 * | 6/2019 | Lessing | B25J 9/142 |
| 2019/0202070 | A1 * | 7/2019 | Nakagawa | B25J 9/1612 |
| 2019/0309928 | A1 * | 10/2019 | Vause | A61B 17/221 |
| 2020/0323536 | A1 * | 10/2020 | Ad | A61B 17/3468 |
| 2021/0039250 | A1 * | 2/2021 | Lessing | B25J 15/0023 |

OTHER PUBLICATIONS

International Search Report for issued in Application No. PCT/FR2020/051887 dated Dec. 10, 2020.
Written Opinion for PCT/FR2020/051887 dated Dec. 10, 2020.

* cited by examiner

METHOD FOR HOLDING A PART BLANK BY FLUID EXPANSION IN AN ADDITIVELY MANUFACTURED HOLDING PORTION

This is the National Stage of PCT international application PCT/FR2020/051887, filed on Oct. 20, 2020 entitled "METHOD FOR HOLDING A PART BLANK BY FLUID EXPANSION IN AN ADDITIVELY MANUFACTURED HOLDING PORTION", which claims the priority of French Patent Application No. 1912228 filed Oct. 30, 2019, both of which are incorporated herein by reference in their entireties.

TECHNICAL FIELD

The invention relates to the technical field of powder-bed additive manufacturing, also known as 3D printing. It relates more specifically to a method for holding a part blank, the part blank and the holding assembly being at least partially additively manufactured by layer-by-layer powder deposition, partially solidified by selecting melting or selective sintering using a laser beam or an electron beam.

BACKGROUND OF THE INVENTION

Powder-bed selective melting or selective sintering methods make it possible to easily produce metal or ceramic parts such as turbine engine parts which are subjected to substantial mechanical and/or thermal stress.

Such methods are particularly known under the acronyms SLM ("Selective Laser Melting"), SLS ("Selective Laser Sintering"), DMLS ("Direct Metal Laser Sintering") and EBM ("Electron Beam Melting").

These methods generally comprise a step of depositing, using a roller or scraper type spreading means, a first powder layer in a manufacturing vessel, the bottom of which is formed by a plate that is movable in translation, followed by a step of heating with a laser beam or with an electron beam a predefined zone of the powder layer. The energy supplied by this beam induces the local melting or local sintering of the powder which, on solidifying, forms a first layer of the part.

The plate is then lowered by a distance corresponding to the thickness of a layer, then a second powder layer is conveyed by the spreading means onto the previous layer. Thereafter, a second layer of the part is formed using the beam. These steps are repeated until the part blank is fully manufactured.

Non-melted or non-sintered powder is then removed. Then, the part blank is held during a heating of the part blank to limit the thermal and/or mechanical stress in the part blank. This heating can also be intended to increase the durability and/or the lifetime of the part blank.

Holding the part blank when removing the powder can pose problems. Moreover, heating the part blank and holding the part blank during heating can generate undesirable mechanical stress on the part blank. Such mechanical stress can prove to be particularly bothersome when the part blank has a relatively low mechanical strength, for example when the part is a blade or more generally it comprises at least one thin wall.

DESCRIPTION OF THE INVENTION

The aim of the invention is that of resolving, at least partially, the problems encountered in prior art solutions.

In this regard, the invention relates to a method for holding a part blank inside a holding assembly. The holding assembly comprises a first holding portion, the part blank and at least partially the first holding portion being manufactured by additive manufacturing. The first holding portion includes an inner cavity containing a fluid.

According to the invention, the holding method comprises a heating of the holding assembly and the part blank to deform the first holding portion by fluid expansion in the inner cavity and to reduce a gap between the part blank and the holding assembly by expansion of the first holding portion in relation to the part blank.

Thanks to the holding method according to the invention, the part blank is held more and/or more easily, while limiting the mechanical stress applied on the part blank.

The invention goes against the general principle which is that of avoiding producing closed inner cavities during the additive manufacturing of a part. The aim of this general principle is particularly that of better providing and controlling the shape, structure and mechanical strength of the part. It particularly makes it possible to reduce the risk of an undesirable presence of non-melted or non-sintered powdery material in the cavity.

The invention is not limited by this constraint, by producing the inner cavity in the first holding portion which is deformable and which is separate from the part to be manufactured.

Removing non-melted or non-sintered powder is particularly facilitated by the relatively large gap between the holding assembly and the part blank, following the melting or the sintering of the powder and before heating the holding assembly and the part blank.

The invention can optionally include one or more of the following features combined with one another or not.

The inner cavity is particularly closed. According to an embodiment specificity, the inner cavity is hermetically sealed to the fluid. Preferably, the fluid is a gas.

According to a further embodiment specificity, the first holding portion comprises an outer wall which delimits the inner cavity and which has a thickness between 0.3 mm and 1 mm, preferably 0.6 mm.

The outer wall has a sufficient thickness to be manufactured by additive manufacturing, while having a sufficiently small thickness to enable a deformation of the first holding portion by expansion of the fluid in the inner cavity. The outer wall is particularly tight to the fluid of the inner cavity.

According to a further embodiment specificity, the inner cavity is configured to stretch between 60% and 100% along a maximum elongation direction of the inner cavity, preferably 80%.

The volume of the inner cavity is large enough to enable the expansion of a large quantity of fluid and the deformation of the first holding portion by fluid expansion.

According to an embodiment specificity, the holding assembly comprises the first holding portion and a second holding portion between which the part blank is located.

According to an embodiment specificity, the first holding portion and the second holding portion each comprise a shell. Each shell includes an outer wall and an inner cavity containing fluid.

Each holding portion is then particularly configured to reduce a gap between the part blank and this holding portion due to a deformation of this holding portion by fluid expansion in the inner cavity of this holding portion.

Alternatively, the second holding portion is devoid of inner cavity, being for example formed by a solid shell or a rigid shell. In this case, the second solid shell is particularly non-deformable when the first holding portion is deformed by expansion of the fluid inside the inner cavity thereof.

Preferably, each holding portion is configured to reduce a gap between the part blank and the holding assembly during a deformation of this holding portion by expansion of this holding portion in relation to the part blank during the heating of the holding assembly and the part blank, so as to hold the part blank in the holding assembly.

The invention also relates to a method for manufacturing a turbine engine part, implementing a holding method as defined above. The manufacturing method comprises the manufacture of the part blank and at least partially the first holding portion by additive manufacturing.

The additive manufacturing method is particularly a powder-bed selective melting or selective sintering method. Preferably, the first holding portion is entirely produced by additive manufacturing.

According to an embodiment specificity, the part blank, the first holding portion and the second holding portion are manufactured by additive manufacturing, preferably from the same material. This material is particularly a metallic material. In particular, the first holding portion and the second holding portion each have a density less than the density of the part blank.

According to an embodiment specificity, the heating of the holding assembly and the part blank takes place during a stress-relieving heat treatment of the part blank to limit the thermal and/or mechanical stress of the part blank.

According to an embodiment specificity, the manufacturing method comprises a separation of the part blank from the holding assembly after heating the holding assembly and the part blank.

Preferably, the manufacturing method comprises a separation of the part blank from a base for the part blank and for the holding assembly, after heating the holding assembly and the part blank.

BRIEF DESCRIPTION OF THE DRAWINGS

The present invention will be understood more clearly on reading the description of embodiment examples given merely by way of indication and in no way limitation with reference to the appended drawings wherein.

DETAILED DESCRIPTION OF SPECIFIC EMBODIMENTS

Identical, similar or equivalent parts of the different figures bear the same reference numbers so as to facilitate the transition from one figure to another.

Figure 1:
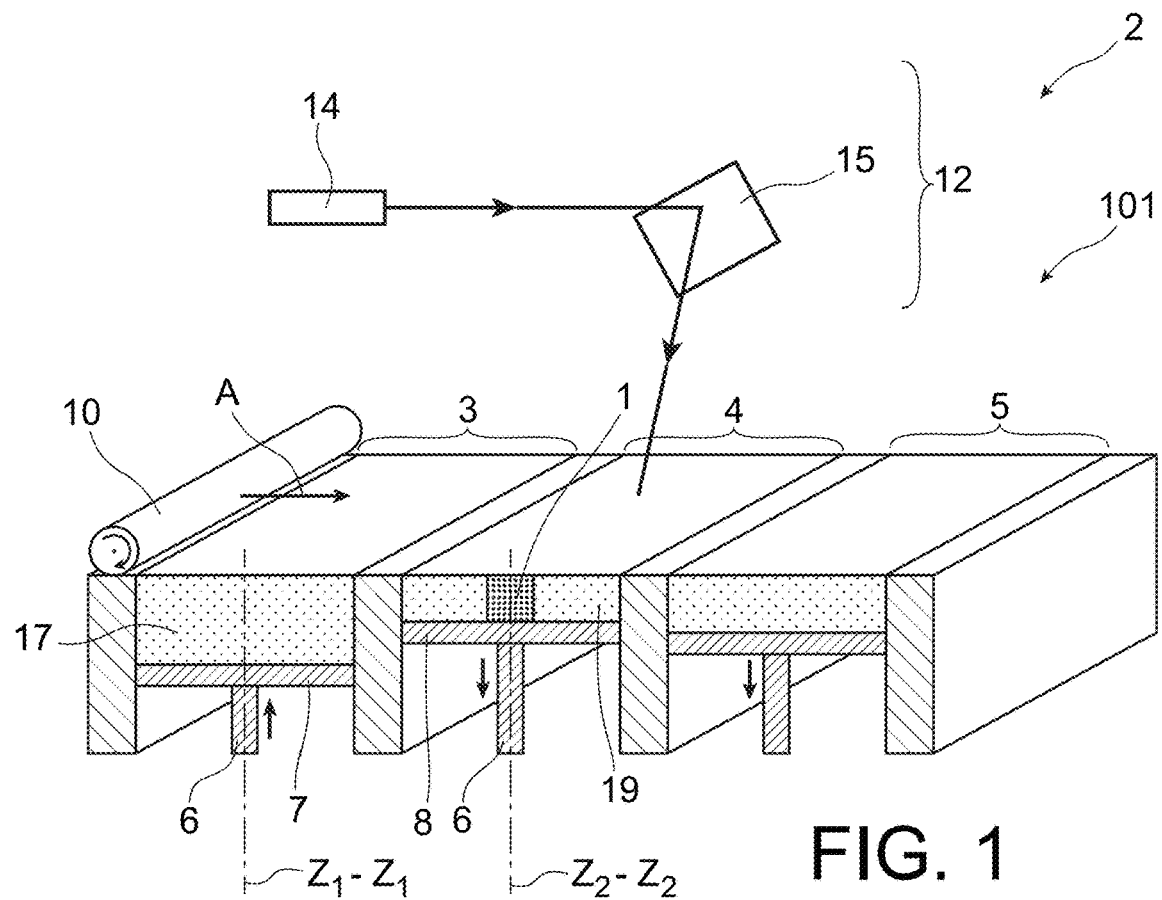
FIG. 1 is a partial schematic representation of an additive manufacturing tool which is used when implementing an additive manufacturing method according to a first embodiment of the invention.

FIG. 1 represents an example of a tool 2 for manufacturing a part 1 by powder-bed selective melting or selective sintering according to a manufacturing method according to a first embodiment.

The part 1 is an aircraft turbine engine part, for example a blade, a wall or a flange. It particularly includes at least one thin wall, which renders it relatively fragile. It is nonetheless designed to withstand particularly substantial mechanical and/or thermal stress during turbine engine operation. It is manufactured by additive manufacturing from a powdery material 17 which is typically a metallic material powder for aeronautical use.

The part 1 comprises a lower end 1a, an upper end 1b which is opposite the lower end 1a and a body 11 between the lower end 1a and the upper end 1b. It is for example not entirely symmetrical in revolution about the longitudinal axis thereof and it has a small thickness, which renders it difficult to manufacture, particularly to hold during the manufacture thereof. In particular, the mechanical stress applied on the part blank 1 must remain low so as not to damage it.

The tool 2 includes a feed vessel 3 of powdery material 17, a manufacturing vessel 4, wherein the part blank 1 will be formed, and a third vessel, which can be a recovery vessel 5 of the excess powdery material or a second feed vessel.

The bottom of each vessel is formed of a plate which is movable in translation along an actuation arm 6 oriented along a vertical axis of the vessels. Each plate comprises a metal panel which forms a base for the powdery material 17. The plate 7 of the feed vessel is configured to move along a first vertical axis Z1-Z1 which is substantially parallel with the second vertical axis Z2-Z2 of the manufacturing plate 8.

Actuating the plate 7 of the feed vessel makes it possible to convey powdery material into the manufacturing vessel 4. The manufacturing plate 8 of the manufacturing vessel, on lowering, enables the creation of the successive layers 19 of the part blank 1.

The tool 2 also includes a spreading means 10, of the roller type such as that shown in FIG. 1 or the scraper type, which makes it possible to push the powdery material 17 from the feed vessel 3 into the manufacturing vessel 4 and spread this powdery material, in the feed vessel 3, so as to form a layer 19 of powder of defined thickness. To do this, the spreading means 10 moves along a horizontal sweeping plane along a movement direction represented by the arrow A ranging from the feed vessel 3 to the recovery vessel 5. The excess powder can be recovered in the recovery vessel 5.

The tool 2 further comprises a heating means 12 configured to melt or sinter at least a portion of a layer 19 of powder deposited on the manufacturing plate 8, so as to obtain, after solidification, a layer 19 of the part blank 1.

The heating means 12 comprises for example a laser 14 and one or more mirrors 15 for sending the laser beam to zones of the powdery material layer 17 to be melted or sintered. The manufacturing vessel 4 will thus contain, after the scanning of the powdery material layer by an energy beam, the layer 19 of solidified material which is surrounded by the non-melted or non-sintered powdery material.

Figure 2:
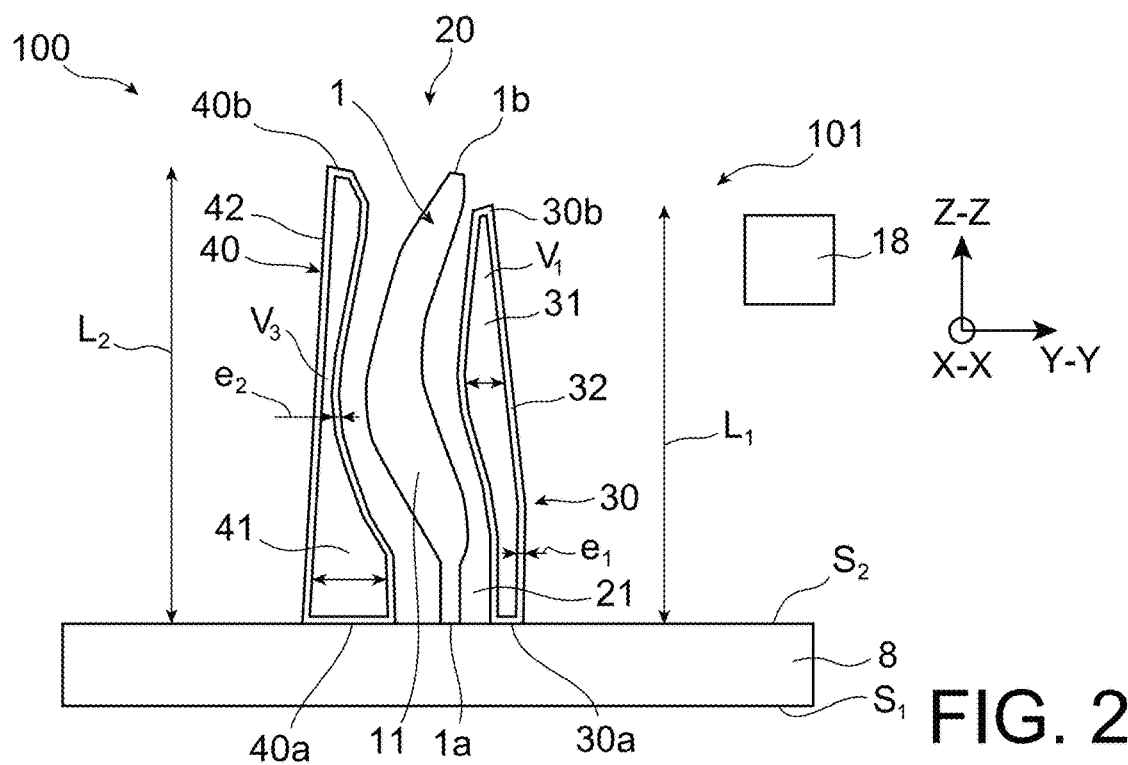
FIG. 2 illustrates the method for manufacturing the part after melting or sintering the powdery material and before tightly holding the part blank.

With reference to FIG. 2, the manufacturing plate 8 comprises a lower outer surface S1 and an upper outer surface S2 which is opposite the lower outer surface S1 and to which are attached the part blank 1 and the holding assembly 20, followed by an additive manufacturing step 101 of the part blank 1 and the holding assembly 20. The holding assembly 20 is made of the same material as the part blank 1.

The holding assembly 20 comprises a first holding portion 30 and a second holding portion 40 which are each located laterally on either side of the part blank 1, following the additive manufacturing step 101. The holding assembly 20 then extends longitudinally along a longitudinal axis Z-Z which is substantially parallel with the longitudinal axis of the part blank 1.

In the present document and unless specified otherwise, an axial or longitudinal direction is a parallel direction with the longitudinal axis Z-Z of the holding assembly 20. A radial or transverse direction X-X or Y-Y is an orthogonal direction to the longitudinal axis Z-Z of the holding assembly and secant with this axis. A circumferential direction is defined as a locally orthogonal direction to a radial direction and to the direction of the longitudinal axis Z-Z of the holding assembly.

Figure 3:
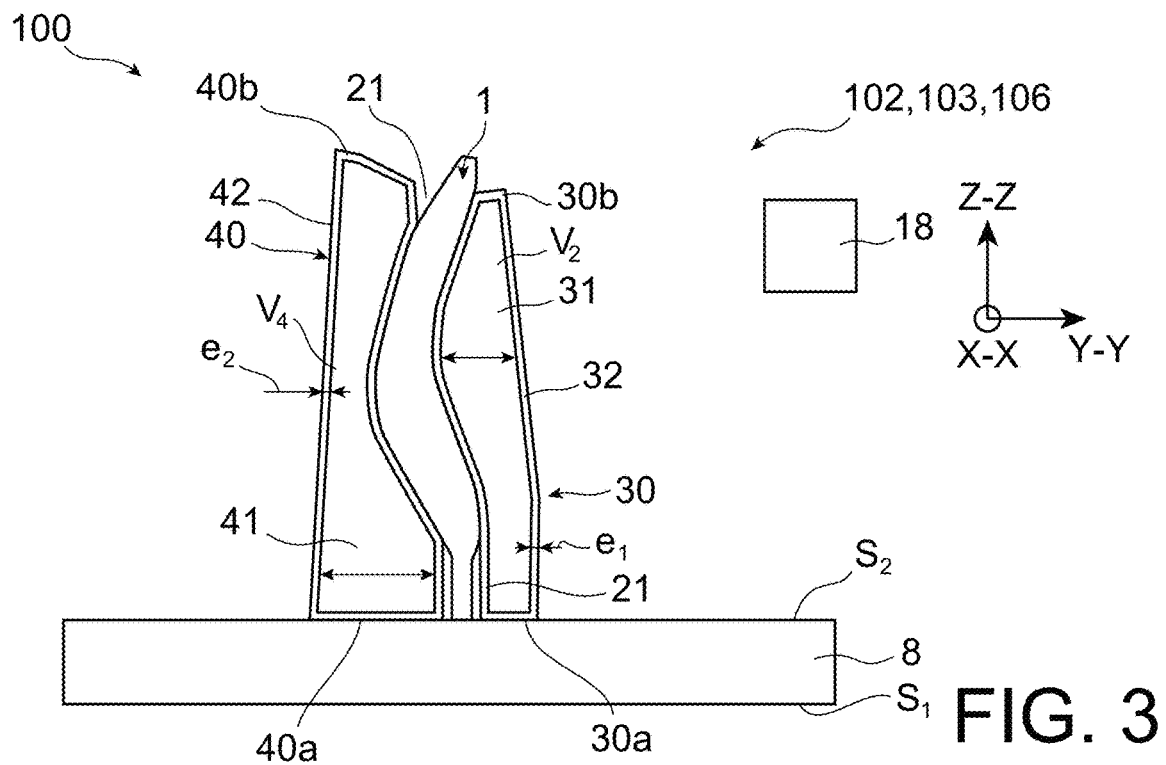
FIG. 3 illustrates the method for manufacturing the part when tightly holding the part blank.

With reference jointly to FIGS. 2 and 3, the holding assembly 20 is configured to deform by stretching transversally to reduce a gap 21 between the part blank 1 and the holding assembly 20 by expansion of the holding assembly 20 in relation to the part blank 1 during a heating 102, 103 of the part blank 1 and the holding assembly 20 in a furnace 18. The holding assembly 20 is designed to hold the part blank 1, while limiting the mechanical stress applied on the part blank 1.

The first holding portion 30 and the second holding portion 40 can particularly each have a density less than the density of the part blank 1, to favour differential expansion of the holding assembly 20 in relation to the part blank 1.

The first holding portion 30 is formed from a first hollow shell which extends longitudinally from a lower end 30*a* to an upper end 30*b* which is opposite the lower end 30*a*. The first holding portion 30 is configured to expand to mould the shape of a first side of the part blank 1 during the heating 102, 103 of the holding assembly 20.

The first holding portion 30 comprises a first outer wall 32 which delimits it externally and which delimits a first inner cavity 31 of the holding assembly 20.

The first inner cavity 31 contains a fluid. This fluid is a gas, typically air which has been trapped in the first inner cavity 31 during the melting or sintering of the powdery material 17 to form the first holding portion 30. The first inner cavity 31 is hermetically sealed to the fluid, which enables the fluid to expand in the first inner cavity 31 and induce the deformation of the first holding portion 30 when it is heated.

During the heating 102, 103 of the holding assembly 20, the first inner cavity 31 is particularly configured to induce an elongation from a width 11 to a width 12 capable of ranging from 60% to 100% along a radial direction Y-Y, X-X of maximum deformation of the first inner cavity 31, for example 80%. The volume of the first inner cavity 31 increases between 40% and 60% from an initial volume V1 which is represented in FIG. 2 to a volume V2 which is represented in FIG. 3.

The first outer wall 32 is tight to the fluid to keep it trapped in the first inner cavity 31. The first outer wall 32 has a thickness e1 between 0.3 mm and 1 mm, for example of 0.6 mm. The thickness e1 of the first outer wall 32 remains substantially constant before and after the heating 102, 103 of the holding assembly 20.

The second holding portion 40 is formed from a second hollow shell which extends longitudinally from a lower end 40*a* to an upper end 40*b* which is opposite the lower end 30*a*. The second holding portion 40 is configured to expand to mould the shape of a second side of the part blank 1 during the heating 102, 103 of the holding assembly 20.

The second holding portion 40 comprises a second outer wall 42 which delimits it externally and which delimits a second inner cavity 41 of the holding assembly 20.

The second inner cavity 41 contains a fluid. This fluid is a gas, typically air which has been trapped in the second inner cavity 41 during the melting or sintering of the powdery material 17 to form the second holding portion 40. The second inner cavity 41 is hermetically sealed to the fluid, which enables the fluid to expand in the second inner cavity 41 and induce the deformation of the second holding portion 40 when it is heated.

During the heating 102, 103 of the holding assembly 20, the second inner cavity 41 is particularly configured to induce an elongation from a width 13 to a width 14 capable of ranging from 60% to 100% along a radial direction Y-Y, X-X of maximum deformation of the second inner cavity 41, for example 80%. The volume of the second inner cavity 41 increases between 40% and 60% from an initial volume V3 which is represented in FIG. 2 to a volume V4 which is represented in FIG. 3. The initial volume V3 of the second inner cavity 41 is for example substantially equal to the initial volume V1 of the first inner cavity 31. The post-heating volume V4 of the second inner cavity 41 is for example substantially equal to the pre-heating volume V2 of the first inner cavity 31.

The second outer wall 42 is tight to the fluid to keep it trapped in the second inner cavity 41. The second outer wall 42 has a thickness e2 between 0.3 mm and 1 mm, for example of 0.6 mm. The thickness e2 of the second outer wall 42 remains substantially constant before and after the heating 102, 103 of the holding assembly 20. The thickness e2 of the second outer wall 42 is for example substantially equal to the thickness e1 of the second outer wall 42.

The manufacturing method 100 of the turbine engine part 1 is described in more detail hereinafter. The manufacturing method 100 comprises the additive manufacturing step 101 of the holding assembly 20 and the part blank 1 on the manufacturing plate 8 by melting or sintering powdery material 17 by means of the tool 2.

The additive manufacturing step 101 comprises a rapid cooling of the part blank 1 and the holding assembly 20, following the melting or sintering of the powdery material 17, which gives rise to mechanical stress, particularly from the shrinkages, as well as the structural variations in the part blank 1 and the holding assembly 20.

The additive manufacturing step 101 can comprise a powder removal which consists of removing the non-melted or non-sintered powdery material 17 which is located in the gap 21 between the holding portion 30 and the part blank 1 and between the part blank 1 and the second holding portion 40. The powder removal is facilitated by the relatively large gap 21 between the holding assembly 20 and the part blank 1, following the melting or the sintering of the powdery material 17 and before heating 102, 103 the holding assembly 20 and the part blank 1.

With reference to FIG. 2, following the additive manufacturing step 101, the first holding portion 30 is attached to the manufacturing plate 8 by the lower end 30*a* thereof which is in mechanical contact with the upper outer surface S2 of the manufacturing plate 8. The second holding portion 40 is attached to the manufacturing plate 8 by the lower end 40*a* thereof which is in mechanical contact with the upper outer surface S2 of the manufacturing plate 8. The part blank 1 is attached at the lower end 1*a* thereof to the manufacturing plate 8. The part blank 1 is located between the first holding portion 30 and the second holding portion 40.

The manufacturing method 100 continues with a heating 102, 103 of the holding assembly 20 and the part blank 1. This heating 102 particularly comprises a first stress-relieving heat treatment which is aimed at reducing the thermal stress, residual mechanical stress and structural variations generated in the part blank 1, in the first holding portion 30 and in the second holding portion 40 during the additive manufacturing step 101. This heating 102, 103 can also comprise a second heat treatment 103 to increase the durability and/or the lifetime of the part blank 1. The heating 102, 103 typically takes place at a temperature greater than 1000° C.

During the heating 102, 103 of the holding assembly 20, the fluid contained in the first inner cavity 31 expands, which leads to the first holding portion 30 deforming. The first holding portion 30 is deformed by stretching transversally, which allows it to mould the shape of one side of the part blank 1.

During the heating 102, 103 of the holding assembly 20, the fluid contained in the second inner cavity 41 expands, which leads to the second holding portion 40 deforming. The second holding portion 40 is deformed by stretching transversally, which allows it to mould the shape of the other side of the part blank 1 in relation to the first holding portion 30. This results in tight holding 106 of the part blank 1 between the first holding portion 30 and the second holding portion 40.

During the heating 102, 103 of the holding assembly 20 and the part blank 1, the holding assembly 20 is deformed by fluid expansion in each inner cavity 31, 41 to reduce the gap 21 between the part blank 1 and the holding assembly 20. The gap 21 between the part blank 1 and the holding assembly 20 is for example 0.1 mm, which enables the holding assembly 20 to mould the shape of the part blank 1. The deformation of the holding assembly 20 by expanding each inner cavity 31, 41 is particularly irreversible. The holding assembly 20 then holds the part blank 1 effectively, while limiting the mechanical stress applied on the part blank 1.

Figure 4:
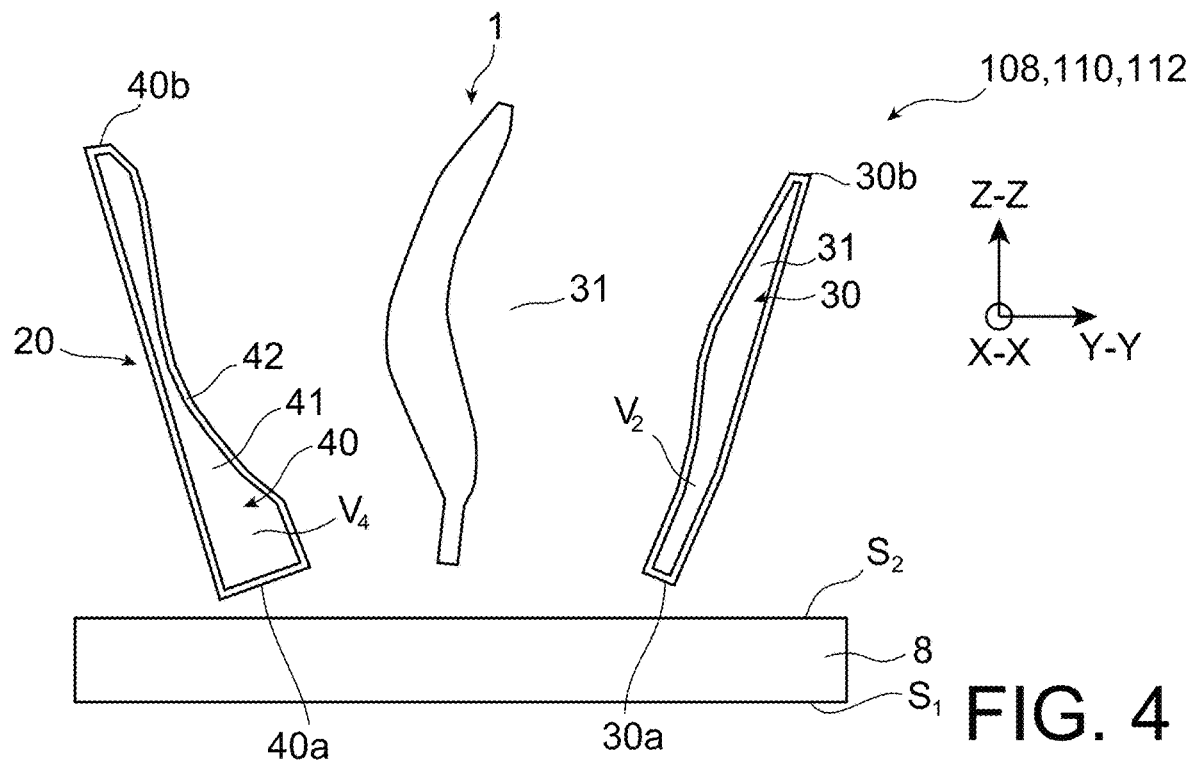
FIG. 4 illustrates the part after machining the part blank and after separating the part blank from the holding assembly and the tool.

Following the holding 106 of the part blank 1 and with reference to FIG. 4, the manufacturing method 100 of the part 1 then comprises a machining 108 of the part blank 1, particularly to separate the lower end 1a of the part blank 1 from the manufacturing plate 8. This machining 108 comprises for example a spark-machining. It can also comprise a machining of the part blank 1, for example a grinding of the part 1.

The manufacturing method 100 also includes a machining 110 of the first holding portion 30, particularly to separate the lower end 30a of the first holding portion 30 from the manufacturing plate 8. This machining 110 comprises for example a spark-machining.

The manufacturing method 100 also includes a machining 112 of the second holding portion 40, particularly to separate the lower end 40a of the second holding portion 40 from the manufacturing plate 8. This machining 112 comprises for example a spark-machining. It can also comprise a machining of the manufacturing plate 8, for example a sandblasting with a view to manufacturing another part 1.

Thanks to the deformation of the holding assembly 20 by differential fluid expansion in each inner cavity 31, 41 in relation to the part blank 1, the part blank 1 is held more and/or easily, while limiting the mechanical stress applied on the part blank 1.

The invention goes against the general principle which is that of avoiding producing closed inner cavities during the additive manufacturing of a part blank 1. The aim of this general principle is particularly that of better providing and controlling the shape, structure and mechanical strength of the part blank. It particularly makes it possible to reduce the risk of an undesirable presence of non-melted or non-sintered powdery material in each inner cavity 31, 41.

The invention is not limited by this constraint, by producing each inner cavity 31, 41 in a holding portion 20 which is deformable, particularly irreversibly, and which is separate from the part 1 to be manufactured.

The removal of the non-melted or non-sintered powdery material 17 is facilitated by the relatively large gap 21 between the holding assembly 20 and the part blank 1, following the melting or the sintering of the powdery material 17 and before heating 102, 103 the holding assembly 20 and the part blank 1.

Obviously, various modifications can be made by a person skilled in the art to the invention described above without leaving the scope of the invention. In particular, the structure of the tool 2, the structure of the holding assembly 20, and the structure of the part 1 can vary in relation to those of the manufacturing method described above.

The first holding portion 30 and the second holding portion 40 can be made from a different material from that of the part blank 1. The first holding portion 30 can be made from a different material from that of the second holding portion 40.

When the first holding portion 30 and/or the second holding portion 40 is made from a material with a thermal expansion coefficient significantly greater than that of the material of the part blank 1, the first holding portion 30 and/or the second holding portion 40 can comprise a higher density.

The fluid inside each inner cavity 31, 41 can have a different component from that of air. This fluid can particularly be an inert gas.

Alternatively, the second holding portion 40 comprises a rigid shell, for example a solid shell, which is non-deformable during the heating 102, 103 of the holding assembly 20 and the part blank 1.

Additionally or alternatively, the holding assembly 20 can include at least three holding portions 40.

The holding assembly 20 is preferably configured to extend radially all around the part blank 1. Nevertheless, the holding assembly 20 can extend partially around the part blank 1.

The deformation of the first holding portion 30 by gas expansion in the first inner cavity 31 and optionally the deformation of the first holding portion 40 by gas expansion in the second inner cavity 41 can take place during the second heat treatment 103 of the part blank 1 and the holding assembly 20, in full or by continuing the deformation of the holding assembly 20 induced during the first heat treatment 102.

At least a portion of the first holding portion 30 and/or at least a portion of the second holding portion 40 can be manufactured other than by additive manufacturing.

Alternatively, the part blank 1 can be separated from the first holding portion 30 and be separated from the second holding portion 40, before being separated from the manufacturing plate 8.

What is claimed is:

1. A holding method for holding a part blank for a turbine engine inside a holding assembly comprising a first holding portion, wherein the first holding portion comprises an inner cavity containing a fluid, wherein the part blank and at least partially the first holding portion is manufactured by metallic material powder-bed additive manufacturing, the holding method comprising:

heating of the holding assembly and the part blank to deform the first holding portion by fluid expansion in the inner cavity and to reduce a gap between the part blank and the holding assembly by expansion of the first holding portion in relation to the part blank so as to hold the part blank in the holding assembly.

2. The holding method according to claim 1, wherein the inner cavity is hermetically sealed to the fluid.

3. The holding method according to claim 2, wherein the fluid is a gas.

4. The holding method according to claim 1, wherein the first holding portion comprises an outer wall which delimits the inner cavity and which has a thickness between 0.3 mm and 1 mm.

5. The holding method according to claim 4, wherein the outer wall which delimits the inner cavity has a thickness of 0.6 mm.

6. The holding method according to claim 4, wherein the inner cavity is configured to stretch between 60% and 100% along a maximum elongation direction of the inner cavity.

7. The holding method according to claim 6, wherein the inner cavity is configured to stretch of 80% along a maximum elongation direction of the inner cavity.

8. The holding method according to claim 1, wherein the holding assembly comprises the first holding portion and a second holding portion between which the part blank is located.

9. The holding method according to claim 8, wherein the first holding portion and the second holding portion each comprise a shell which includes an outer wall and an inner cavity containing fluid.

10. A manufacturing method for manufacturing a turbine engine part, wherein the manufacturing method implements a holding method according to claim 1, comprising the manufacture of the part blank and at least partially of the first holding portion by additive manufacturing.

11. The manufacturing method according to claim 10, wherein the additive manufacturing method is a metallic material powder-bed selective melting method or a metallic material powder-bed selective sintering method.

12. The manufacturing method according to claim 11, wherein the part blank, the first holding portion and the second holding portion are manufactured by additive manufacturing.

13. The manufacturing method according to claim 12, wherein the part blank, the first holding portion and the second holding portion are manufactured by additive manufacturing from the same metallic material.

14. The manufacturing method according to claim 12, wherein the first holding portion and the second holding portion each have a density less than the density of the part blank.

15. The manufacturing method according to claim 10, wherein the heating of the holding assembly and the part blank takes place during a stress-relieving heat treatment of the part blank to limit the thermal and/or mechanical stress of the part blank.

16. The manufacturing method according to claim 10, comprising a separation of the part blank from the holding assembly, after heating the holding assembly and the part blank.

17. The manufacturing method according to claim 10, comprising a separation of the part blank from a base for the part blank and for the holding assembly, after heating the holding assembly and the part blank.

* * * * *